US009996737B2

(12) United States Patent
Shreve et al.

(10) Patent No.: US 9,996,737 B2
(45) Date of Patent: *Jun. 12, 2018

(54) METHOD AND SYSTEM FOR AUTOMATICALLY RECOGNIZING FACIAL EXPRESSIONS VIA ALGORITHMIC PERIOCULAR LOCALIZATION

(71) Applicant: Conduent Business Services, LLC, Dallas, TX (US)

(72) Inventors: Matthew Adam Shreve, Mountain View, CA (US); Michael C. Mongeon, Walworth, NY (US); Robert P. Loce, Webster, NY (US); Edgar A. Bernal, Webster, NY (US); Wencheng Wu, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/460,848

(22) Filed: Mar. 16, 2017

(65) Prior Publication Data

US 2017/0185826 A1  Jun. 29, 2017

Related U.S. Application Data

(62) Division of application No. 13/598,098, filed on Aug. 29, 2012, now Pat. No. 9,600,711.

(51) Int. Cl.
*G06K 9/00* (2006.01)
(52) U.S. Cl.
CPC ..... *G06K 9/00302* (2013.01); *G06K 9/00228* (2013.01); *G06K 9/00771* (2013.01)

(58) Field of Classification Search
CPC .......... G06K 9/00228; G06K 9/00315; G06K 2009/4666; G06K 9/00302; G06K 9/00771

See application file for complete search history.

(56) References Cited

U.S. PATENT DOCUMENTS

| 5,465,115 | A | 11/1995 | Conrad et al. |
| 5,581,625 | A | 12/1996 | Connell |
| 5,905,807 | A * | 5/1999 | Kado ................... A61B 5/1176 |
| | | | 375/E7.083 |
| 5,953,055 | A | 9/1999 | Huang et al. |
| 6,195,121 | B1 * | 2/2001 | Huang ............... G06K 9/00228 |
| | | | 348/144 |
| 6,654,047 | B2 | 11/2003 | Iizaka |
| 6,879,709 | B2 | 4/2005 | Tian |
| 6,967,674 | B1 | 11/2005 | Lausch |

(Continued)

OTHER PUBLICATIONS

C. Shan and S. Gong and P.W. Mcowan, "Facial expression recognition based on Local Binary Patterns: A computer study", Image and Vision Computing, vol. 27, issue 6, pp. 803-816, 2009.*

(Continued)

*Primary Examiner* — Michael Lee
*Assistant Examiner* — Humam Satti
(74) *Attorney, Agent, or Firm* — Fay Sharpe LLP

(57) ABSTRACT

This disclosure provides a method and system for automatically recognizing facial expressions at variable resolutions of video. According to one exemplary method, facial expressions are detected, extracted and classified from a video sequence based on an automatic localization of the periocular region associated with a detected and extracted face.

8 Claims, 11 Drawing Sheets

(56) References Cited

U.S. PATENT DOCUMENTS

| | | | | |
|---|---|---|---|---|
| 7,660,482 | B2* | 2/2010 | Huang | G06T 11/00 345/646 |
| 7,688,349 | B2 | 3/2010 | Flickner et al. | |
| 8,126,220 | B2 | 2/2012 | Greig | |
| 8,488,023 | B2 | 7/2013 | Bacivarov | |
| 2003/0016846 | A1* | 1/2003 | Chen | G06K 9/00268 382/117 |
| 2006/0088207 | A1* | 4/2006 | Schneiderman | G06K 9/00241 382/159 |
| 2007/0154096 | A1 | 7/2007 | Cao | |
| 2008/0201144 | A1 | 8/2008 | Song | |
| 2009/0220156 | A1* | 9/2009 | Ito | G06K 9/00248 382/201 |
| 2009/0285456 | A1 | 11/2009 | Moon | |
| 2010/0172587 | A1 | 7/2010 | Hwang | |
| 2010/0296706 | A1* | 11/2010 | Kaneda | G06K 9/00281 382/118 |
| 2011/0263946 | A1* | 10/2011 | el Kaliouby | A61B 5/1128 600/300 |
| 2016/0217319 | A1 | 7/2016 | Bhanu | |

OTHER PUBLICATIONS

C. Shan and S. Gong and P.W. Mcowan, "Facial expression recognition based on Local Binary Patterns: A comprehensive study", Image and Vision Computing, vol. 27, issue 6, pp. 803-816, 2009.

M.S. Bartlett, G. Littlewort, M. Frank, C. Lainscsek, I. Fasel, J. Movellan, "Recognizing facial expression: machine learning and application to spontaneous behavior", in: IEEE Conference on Computer Vision and Pattern Recognition (CVPR), 6 pages, 2005.

W. Wang, F. Chang, G. Zhang, X. Sun, "A Precise Eye Localization Method Based on Ratio Local Binary Pattern", JCIT: Journal of Convergence Information Technology, vol. 6, No. 1, pp. 126-134, 2011.

T. Kanade, J.F. Cohn and Y. Tian, "Comprehensive database for facial expression analysis." Proceedings of the Fourth IEEE International Conference on Automatic Face and Gesture Recognition, Grenoble, France, pp. 46-53, 2000.

Nelder, J. A. and Mead, R, "A Simplex Method for Function Minimization", The Computer Journal vol. 7, No. 1, pp. 308-313, 1965.

Timo Ahonen, Abdenour Hadid, and Matti Pietikainen, "Face recognition with local binary patterns", Computer Vision—ECCV, pp. 469-481, 2004.

M. Pantic, L. J. M. Rothkrantz, "Automatic analysis of facial expressions: The state of the art", IEEE Transactions on Pattern Analysis and Machine Intelligence, vol. 22 (2000), pp. 1424-1445.

Cristinacce, T. Cootes, "Feature Detection and Tracking with Constrained Local Models", British Machine Vision Conference, Edinburgh, UK, 2006, pp. 928-938.

http://www.mathworks.com/matlabcentral/fileexchange/4317-state-machine-simplex-minimizer/content/Simplex.m, 3 pages, printed Dec. 9, 2011.

http://www.kyb.tuebingen.mpg.de/bs/people/spider/index.html, 3 pages, printed Dec. 9, 2011.

http://en.wikipedia.org/wiki/Vitruvian_Man, 6 pages, printed Dec. 9, 2011.

http://www.csie.ntu.edu.tw/~cjlin/libsvm/ 4 pages, printed Dec. 9, 2011.

Andrew Ryan et al., "Automated Facial Expression Recognition System", pp. 172-177, 2009, Carnegie Mellon Libraries, IEEE Xplore.

* cited by examiner

METHOD AND SYSTEM FOR AUTOMATICALLY RECOGNIZING FACIAL EXPRESSIONS VIA ALGORITHMIC PERIOCULAR LOCALIZATION

This application is a Divisional Patent Application from U.S. patent application Ser. No. 13/598,098, filed on Aug. 29, 2012, by Shreve et al. and entitled "A METHOD AND SYSTEM FOR AUTOMATICALLY RECOGNIZING FACIAL EXPRESSIONS VIA ALGORITHMIC PERIOCULAR LOCALIZATION" and is incorporated herein by reference in its entirety.

BACKGROUND

Recognizing facial expressions at low resolutions in surveillance video typically involves manual processes that may or may not be aided or assisted by computer analytic algorithms. In both "Facial expression recognition based on Local Binary Patterns: A comprehensive study", by Shan et al. and "Recognizing facial expression: machine learning and application to spontaneous behavior" by Bartlett et al., work has been done that classifies facial expressions at low resolutions, however only after the face and eyes have been manually selected. This process is typically time-consuming and requires the prolonged attention of several surveillance personnel; hence completely automating this approach is highly desirable.

INCORPORATION BY REFERENCE

U.S. Pat. No. 5,465,115 by Conrad et al., issued Nov. 7, 1995 and entitled "VIDEO TRAFFIC MONITOR FOR RETAIL ESTABLISHMENTS AND THE LIKE";

U.S. Pat. No. 5,581,625 by Connell, issued Dec. 3, 1996 and entitled "STEREO VISION SYSTEM FOR COUNTING ITEMS IN A QUEUE";

U.S. Pat. No. 5,953,055 by Huang et al., issued Sep. 14, 1999 and entitled "SYSTEM AND METHOD FOR DETECTING AND ANALYZING A QUEUE";

U.S. Pat. No. 6,195,121 by Huang et al., issued Feb. 27, 2001 and entitled "SYSTEM AND METHOD FOR DETECTING AND ANALYZING A QUEUE";

U.S. Pat. No. 6,654,047 by Iizaka, issued Nov. 25, 2003 and entitled "METHOD OF AND DEVICE FOR ACQUIRING INFORMATION ON A TRAFFIC LINE OF PERSONS";

U.S. Pat. No. 6,967,674 by Lausch, issued Nov. 22, 2005 and entitled "METHOD AND DEVICE FOR DETECTING AND ANALYZING THE RECEPTION BEHAVIOR OF PEOPLE";

U.S. Pat. No. 7,688,349 by Flickner et al., issued Mar. 30, 2010 and entitled "METHOD OF DETECTING AND TRACKING GROUPS OF PEOPLE";

C. Shan and S. Gong and P. W. Mcowan, "Facial expression recognition based on Local Binary Patterns: A comprehensive study", Image and Vision Computing, vol. 27, issue 6, pp. 803-816, 2009;

M. S. Bartlett, G. Littlewort, M. Frank, C. Lainscsek, I. Fasel, J. Movellan, "Recognizing facial expression: machine learning and application to spontaneous behavior", in: IEEE Conference on Computer Vision and Pattern Recognition (CVPR), 2005;

W. Wang, F. Chang, G. Zhang, X. Sun, "A Precise Eye Localization Method Based on Ratio Local Binary Pattern", JCIT: Journal of Convergence Information Technology, Vol. 6, No. 1, pp. 126-134, 2011;

T. Kanade, J. F. Cohn and Y. Tian, "Comprehensive database for facial expression analysis." Proceedings of the Fourth IEEE International Conference on Automatic Face and Gesture Recognition, Grenoble, France, pp. 46-53, 2000;

Nelder, J. A. and Mead, R, "A Simplex Method for Function Minimization", The Computer Journal Vol. 7, No. 1, pages 308-313, 1965 (replacing "fitting curves");

Timo Ahonen, Abdenour Hadid, and Matti Pietikainen, "Face recognition with local binary patterns", Computer Vision—ECCV, pp 469-481, 2004;

M. Pantic, L. J. M. Rothkrantz, "Automatic analysis of facial expressions: The state of the art", IEEE Transactions on Pattern Analysis and Machine Intelligence, Vol. 22 (2000), pp. 1424-1445;

D. Cristinacce, T. Cootes, "Feature Detection and Tracking with Constrained Local Models", British Machine Vision Conference, Edinburgh, U K, 2006, pp. 928-838;

http://www.mathworks.com/matlabcentral/fileexchange/4317-state-machine-simplex-minimizer/content/Simplex.m;

http://www.kyb.tuebingen.mpg.de/bs/people/spider/index.html;

http://en.wikipedia.org/wiki/Vitruvian_Man;

http://www.csie.ntu.edu.tw/~cjlin/libsvm/; and

Andrew Ryan et al., "Automated Facial Expression Recognition System", pages 172-177, 2009, Carnegie Mellon Libraries, IEEE Xplore, are all incorporated herein by reference in their entirety.

BRIEF DESCRIPTION

In one embodiment of this disclosure, described is a computer implemented method of detecting, extracting and classifying a facial expression associated with a human face, the human face initially captured with an image capturing system, the method comprising a) training a classifier on features extracted from labeled facial expression images; b) acquiring a surveillance video sequence using at least one video camera operatively connected to a computer; c) detecting, for a given frame in the video sequence, one or more faces if present; d) localizing automatically, for at least one detected face, a periocular region and segmenting a facial region of the image based on geometric ratios; e) processing each detected face image to a suitable lighting and scale condition; f) extracting representative features for each detected face image; and g) classifying automatically, the expression of a detected face by querying the extracted representative features corresponding to each detected face into the classifier, which outputs an expression class.

In another embodiment of this disclosure, described is an image capturing system comprising an image capturing device; and an image processor operatively associated with the image capturing device, the image processor configured to perform a method of detecting, extracting and classifying a facial expression associated with a human face, the method comprising a) detecting a video frame including the human face, the video frame including a plurality of video frame pixels; b) extracting a first pixel region from the detected video frame, the first pixel region including a first subset of the plurality of video frame pixels which include the human face; c) extracting a periocular pixel region from the first pixel region, the periocular pixel region including a subset of the first pixel region including a periocular region of the human face; d) extracting a second pixel region from the detected video frame, the second pixel region including a second subset of the plurality of video frame pixels substantially centered about the periocular region and including a greater number of pixels than the periocular region; e) extracting a feature vector from the second pixel region, the feature vector providing a signature associated with the expression of the detected human face; and f) classifying the appearance of the human face associated with the video frame as including a facial expression based on the extracted feature vector.

In yet another embodiment of this disclosure, described is a computer implemented method of detecting, extracting and classifying a facial expression associated with a human face, the human face initially captured with an image capturing system, the method comprising a) detecting a video frame including the human face, the video frame including a plurality of video frame pixels; b) extracting a first pixel region from the detected video frame, the first pixel region including a first subset of the plurality of video frame pixels which include the human face; c) extracting a periocular pixel region from the first pixel region, the periocular pixel region including a subset of the first pixel region including a periocular region of the human face; d) extracting a second pixel region from the detected video frame, the second pixel region including a second subset of the plurality of video frame pixels substantially centered about the periocular region and including a greater number of pixels than the periocular region; e) extracting a feature vector from the second pixel region, the feature vector providing a signature associated with the human face; and f) classifying the human face associated with the video frame as including a facial expression based on the extracted feature vector.

BRIEF DESCRIPTION OF THE DRAWINGS

FIG. 6 shows a R-LBP (Ratio-Local Binary Pattern) image;

FIG. 7 illustrates the vertical projection of the initial upper half of the face shown in FIG. 6;

FIG. 8 and FIG. 9 illustrate the final search space for the left eye region and right eye region, respectively;

FIG. 10 and FIG. 11 illustrate the final search space shown in FIG. 8 and FIG. 9, dilated;

FIG. 12 and FIG. 13 show vertical projections used to find the centroid of the left and right eye regions, respectively;

FIG. 14 and FIG. 15 show horizontal projections used to find the centroid of the left and right eye regions, respectively;

FIG. 16 shows the final estimates of the location of the eyes within a black rectangular;

DETAILED DESCRIPTION

Figure 1:
FIG. 1 is an example (TET1) video frame from a surveillance dataset according to an exemplary embodiment of this disclosure.

The present disclosure provides image processing methods and systems that automatically detect and classify facial expressions in a surveillance video, i.e. image capturing and processing system. According to an exemplary embodiment, an algorithmic method is executed that does not require any special equipment, except a webcam or other surveillance camera. The method executed includes several steps which are used for processing each frame of a video sequence acquired from the image capturing system: (1) faces are initially detected using a Haar-feature classifier that is trained to detect human faces; (2) for each face, an eye-region localization algorithm locates the periocular region of the face, which is then used to segment the boundary of the face; (3) each face image undergoes a pre-processing step that entails histogram equalization and regularization to a common coordinate system; (4) a discriminate feature vector of each face is then captured/extracted using windowed local binary patterns; and (5) lastly, the feature vector is then classified using a support vector machine that has been trained on a facial expression database. Notably, the method can operate on a relatively low cost webcam, as well as a webcam integrated into a laptop monitor. Furthermore the disclosed method can run at near real-time speeds. Note that we use the terms "human face" and human face image" synonymously to simplify the written description.

Due to the advances and increased availability of surveillance technology over the past few decades, it has become increasingly common to capture and store video footage of retail settings for the protection of the retail companies, as well as for the security and protection of employees and customers. In addition, this video data has also been of interest to retail markets for its potential for data-mining, and for estimating consumer behavior and experience.

Slight improvements in efficiency or customer experience have a large financial impact. For example, some fast food retailers' processes are heavily data driven, and they therefore have a strong interest in numerous customer and store metrics such as queue lengths, experience time in-store and drive-through, specific order timing, order accuracy, and customer response.

Several patents and/or publications disclose retail-setting applications for surveillance video beyond well-known security and safety applications. See U.S. Pat. No. 5,465,115 which counts detected people and records the count according to the direction of movement of the people. See U.S. Pat. Nos. 5,953,055, 5,581,625 and 6,195,121 which are examples of monitoring queues. See U.S. Pat. No. 6,654,047 which monitors groups of people within queues. See U.S. Pat. No. 7,688,349 which monitors various behaviors within a reception setting. However, the references do not detect expression within a retail setting or a surveillance setting, within a queue, or how an expression evolves over the timeframe of a queue, all of which the present disclosure provides.

Automatically recognizing emotional facial expressions associated with a human face can potentially be an effective measure that helps encapsulate a customer's experience. The method and system provided in this disclosure accurately recognizes expressions from human faces at multiple resolutions.

Figure 2:
FIG. 2 is another example (TET2) video frame from a surveillance dataset according to an exemplary embodiment of this disclosure.

To facilitate a better understanding, example video frames from a dataset containing individuals in a simulated fast-food setting are shown in FIGS. 1 and 2. In order to best simulate a real-world setting, several participants were asked to form a queue at a counter with video cameras placed behind a cashier's table as shown in FIG. 1. Participants were given money-like certificates to place a food order at the counter. Customers then waited for 2-3 minutes in line. The participants in this scenario were not asked to feign expressions and were not aware that capturing their expressions was an objective. Therefore expressions were genuine and generally found to consist of only of neutral and smile. A second scenario consisted of video recording participants standing in a queue in a cafeteria-like setting who were asked to feign several expressions: happy, sad, and surprise, as shown in FIG. 2. While the expressions of FIG. 2 are not genuine, it provides evidence that the disclosed method and system is capable of recognizing a range of expressions.

There are several papers in the literature that address expression recognition. In general, they fall into two categories. See "Automatic analysis of facial expressions: The state of the art". The first category consists of methods that generate point models of a human face, where the interdynamics of these points can signal different expressions. For example, "Feature Detection and Tracking with Constrained Local Models" provides 20 points that are automatically detected and tracked on the face throughout a video sequence using a constrained local model (CLM). These points are then used in conjunction with a facial action coding system (FACS) to recognize seven different expressions, i.e., neutral, happy, sad, fear, disgust, anger, and surprise. See "Automated Facial Expression Recognition System". However, the main drawback of these types of approaches is the inability to accurately extract several required specific facial features at low face resolutions.

The second category of expression recognition methods are designed to create a more holistic model of the face, i.e., they rely on a more comprehensive description of the face. For example, these methods include those that represent the face using local binary patterns or Gabor filters. See "Facial expression recognition based on Local Binary Patterns: A comprehensive study" and "Recognizing facial expression: machine learning and application to spontaneous behavior." The facial features are extracted from the face image and used as inputs to a trained classifier for recognition.

Potential drawbacks associated with these methods include susceptibility to image noise, poor alignment, and lighting. The method disclosed herein falls into the second category discussed above; however, the localization of the periocular region of the face is used to register each face image, a step which is manually performed in the literature for holistic methods. Furthermore, steps are taken to reduce the adverse effects of temporally inconsistent and otherwise poor illumination and image noise by utilizing several pre-processing algorithms.

The present disclosure provides a method and system that recognize facial expressions in surveillance footage that may contain low resolution face images recorded using standard low-cost cameras where known methods typically require manual assistance. Each video frame is processed independently and can run at near real-time speeds, i.e., approximately 10 frames per second.

There are two main processing stages in the exemplary method. The first process stage is an offline training process, which learns from hundreds of examples of each expression to train a classifier. The second process stage is an online process that runs on separate data than the training process stage and classifies each facial expression into one of several categories based on the generalizations learned in the first offline process stage. Both process stages share many steps which are described below:

Offline training process stage (FIG. 3):
1. Acquire a surveillance video sequence using at least one video camera 10 operatively connected to a computer 15;
2. For a given frame in the video sequence, detect one or more faces if present in the video image;
3. For at least one detected face, automatically localize the periocular region and segment the facial region of the image based on geometric ratios;
4. Process each face image to increase robustness to lighting and scale variation;
5. Assign each detected face to an expression category or label;
6. Calculate representative features for the face image;
7. Determine a correspondence between the representative features and the expression category;
8. Repeat the labeling steps until all faces of interest have been processed resulting in a labeled feature set, and
9. Train a classifier using the labeled feature set.

Figure 3:
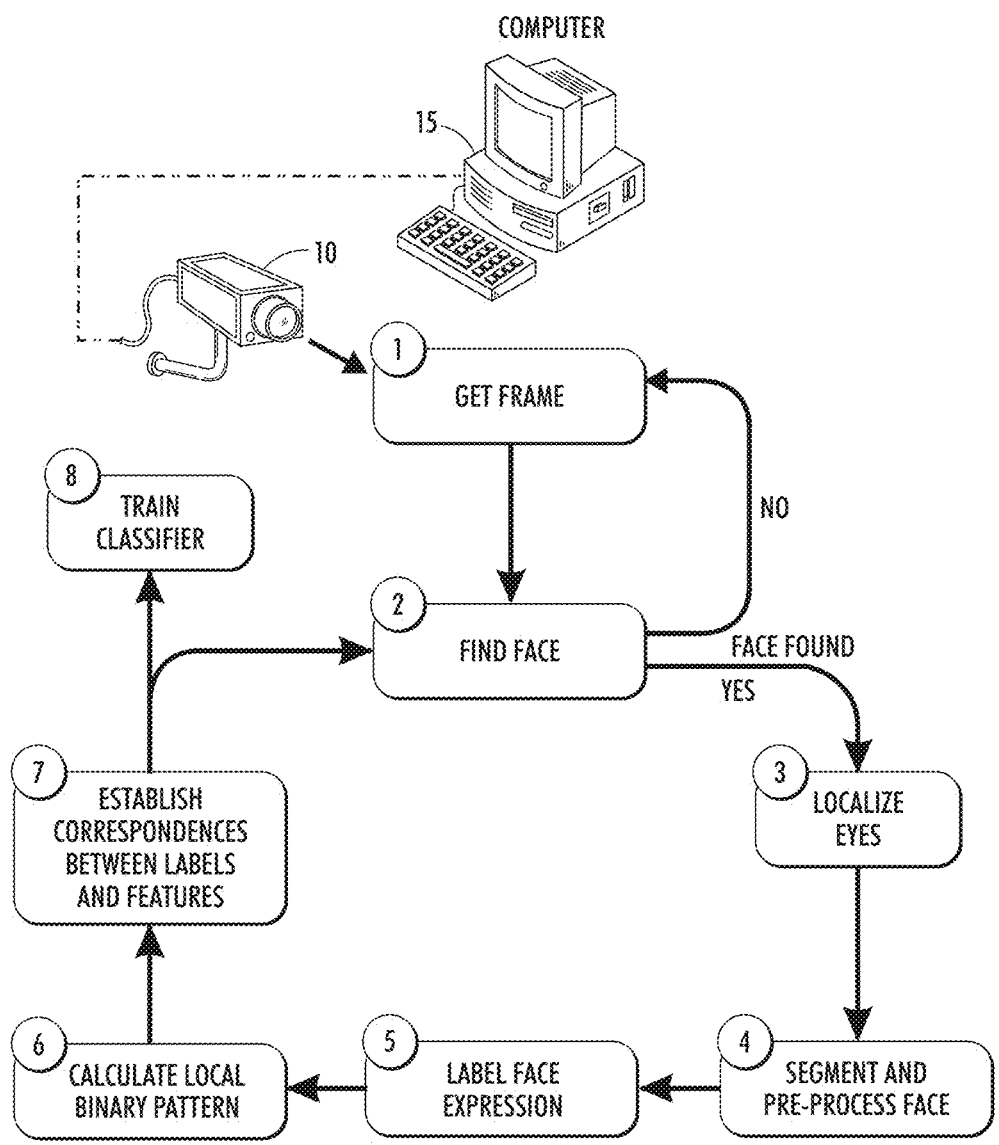
FIG. 3 is a block diagram of an offline processing stage according to an exemplary embodiment of this disclosure.

Online process stage (FIG. 4):
1. Acquire a surveillance video sequence using at least one video camera 10 operating connected to a computer 15;
2. For a given frame in the video sequence, detect one or more faces if present;
3. For a detected face, automatically localize the periocular region and segment the facial region of the image based on geometric ratios;
4. Process each face image to a suitable lighting and scale condition;
5. Calculate the representative features used in the offline process for face images; and
6. Automatically classify the expression of the face using the features and the trained classifier generated in the offline training stage. (FIG. 3)

The presently disclosed facial expression classification method and system can operate in a common video surveillance environment. For purposes of this disclosure, a common surveillance environment may include use of common low resolution unmonitored cameras, and optionally the use of multiple cameras. According to one exemplary embodiment, facial expressions are monitored over time. The time dependence can be within a fixed simple queue, e.g., a waiting line, or as passed from camera to camera, e.g., entering and exiting a store. For example, facial expressions associated with customers in a retail environment can be recognized and associated over a plurality of temporal spaced video frames to determine if an expression tends to be more positive (e.g. happy, surprised) or negative (e.g. anger, sad, disgusted) at various portions of a customer's experience. Did a customer's expression change from positive to negative, or vice versa when they entered and exited the retail environment? Did a positive/negative trend evolve over the time a customer was waiting in a queue? Did a customer's expression change as they interacted with an employee, i.e. ordering, paying, receiving order, etc.? Is a detected facial expression of an employee related to a change in a customer facial expression? In a multi-camera system, the association of a series of facial expressions with a particular customer will require customer identity re-identification across multiple camera views. Within a single camera, this problem can be solved with well-known video-based object tracking methods.

The following description provides additional details of the exemplary offline training process stage and the online process stage exemplary outlined above.

Offline Step 1. Acquire Video:

Videos can be acquired using a high resolution camera (e.g., 1080×1920) and/or a low-resolution camera (e.g. 640× 480). According to one exemplary embodiment, videos using two cameras are captured at 30 frames per second under normal room lighting conditions. The system can also run in real time on live data streams captured using an image acquisition software package.

Offline Step 2. Detect Faces:

A computer implemented algorithm is used to detect faces, such as the Viola-Jones and/or Zdenek detectors. The Viola-Jones and/or Zdenek face detectors can be used to extract all faces found in each frame of the video sequence. The publically available implementations of these algorithms are trained on several thousand face images and are written for MATLAB, which can be used as an image acquisition software package for acquiring video in step 1. The Viola-Jones face detector is based on Haar features, or rectangular features, that are extracted by convolving several cascades over integral images to find "face-like" regions. The Zdenek face detector improves on the Viola-Jones method by utilizing a bootstrapping and boosting method that learns the best cascades and features for very large training datasets. During experiments, the Viola-Jones face detector performed faster than Zdenek, but at the expense of a higher false positive rate. This problem can typically be reduced by enforcing restrictions such as the size and position of possible faces. Depending on the requirements, e.g. real-time, unknown location, either method for detecting faces can be selected. In an alternative embodiment, each face is only detected once in the frame where it first appears, and is then tracked in subsequent frames with well-known video-based object tracking methods. This method may be more computationally efficient than methods that perform face detection on every frame.

Offline Step 3. Localize Periocular Region:

Automatically detecting the eyes in images is a non-trivial task for typical low resolution surveillance video and is traditionally a manual process for expression analysis algorithms, especially expression recognition. Although the manual process can be alleviated by accurate face detection and extraction, it is infeasible to locate the center of each eye region since such details are often missing in the face images themselves. Instead, a modified and novel version of "A Precise Eye Localization Method Based on Ratio Local Binary Pattern" is used for estimating the position of the periocular region of the face, opposed to the exact position of the eyes, since such details are often missing in low-resolution face images.

As stated above, a computer implemented algorithm is used to detect the periocular regions. One aspect of the algorithm uses Local Binary Patterns or Ratio-Local Binary Patterns. The eye localization method based on the ratio-local binary pattern (R-LBP) of the face is a generalization of local binary pattern (LBP). Both the R-LBP and LBP are discussed in this section due to the similarities of each method, however, LBP is applied in step 6 to calculate LBP features.

Figure 5:
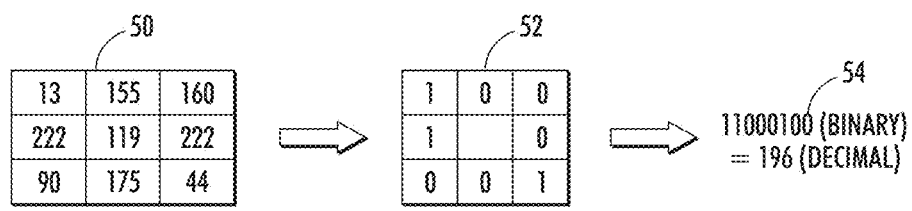
FIG. 5 is a block diagram illustrating one example of calculating a LBP (Local Binary Pattern)

With reference to FIG. 5, an LBP is a local descriptor that assigns an 8-bit "texture" value 54 for each pixel in an image. It is based on the difference in values between the center pixel (e.g. 119 of reference character 50) and its eight neighbors (e.g. 13, 155, 160, 222, 222, 90, 175 and 44 of reference character 50) at a specific radius. For an embodiment of the disclosed method, the radius is fixed to one, therefore the neighbors consists of the immediate eight surrounding pixels. But, note that other radii may be used. Each of these neighbors corresponds to a bit, and is assigned a value of one if its value is greater than the center pixel and a zero otherwise. These eight bits 52, which are typically ordered by starting at the value to the immediate left of the center and moving clockwise, form the final LBP byte value 54.

Specifically, the byte for a pixel at position $I_c$ is encoded by the relationship to its eight neighbors $I_n$ shown in the following equation:

$$LBP(I_c) = \sum_{n=0}^{7} 2^n f(I_c, I_n) \quad (1)$$

where, $$f(I_c, I_n) = \begin{cases} 1 & \text{if } I_c \geq I_n \\ 0 & \text{otherwise} \end{cases} \quad (2)$$

The LBP operator describes several different orientations and types of edge features in the image, giving equal priority for all possibilities found. However, for the application of eye localization, it is optimal to prioritize certain "strong" types of edges or areas with a large contrast. These types of regions are typically found within the periocular region, where facial features such as the eyebrows and pupils show significant disparities in brightness levels. The R-LBP allows for this selectivity, i.e. prioritization by generalizing the LBP to include a ratio bases thresholdr. See "A Precise Eye Localization Method Based on Ratio Local Binary Pattern". It is calculated by modifying f to $f_g$ such that $$f_g(I_c, I_n) = \begin{cases} 1 & \text{if } I_n/I_c \geq r \\ 0 & \text{otherwise} \end{cases} \quad (3)$$

If r=1, then f=$f_g$, hence LBP is a special case of R-LBP. Choosing the correct value for r depends mainly on the brightness and direction of the scene illumination. For example, if strong illumination is directed from above a subject's face, then strong shadows are cast downward on the face. Hence, a higher value, r=1.4, is required that selects only the strongest, i.e. highest contrast, edges. However, if illumination is even distributed across the subject's face, then a lower value, r=1.1, is required.

Figure 6:
FIGS. 6-16 illustrate eye localization steps according to an exemplary embodiment of this disclosure.
Figure 7:
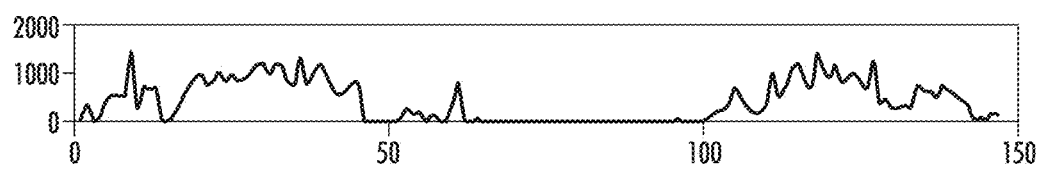
Figure 8:
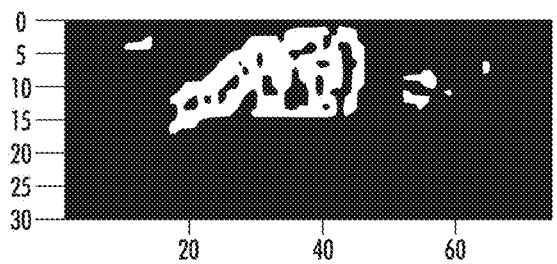
Figure 9:
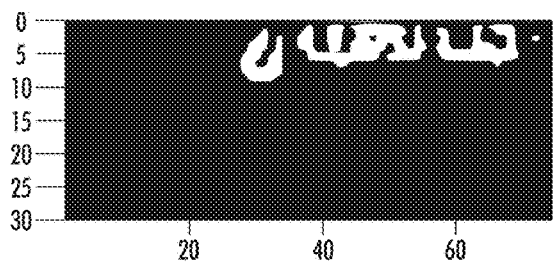
Figure 10:
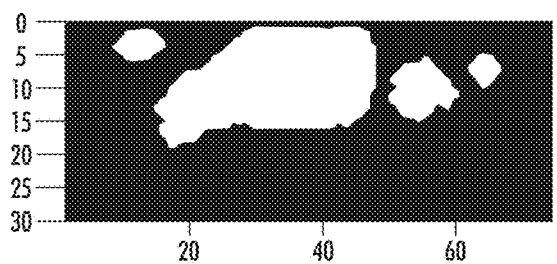
Figure 11:
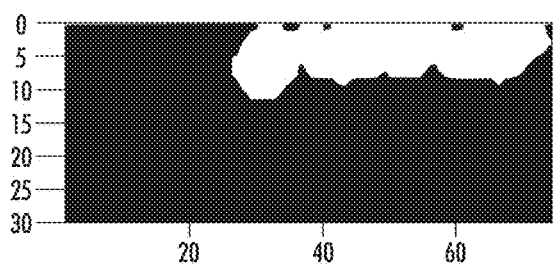
Figure 12:
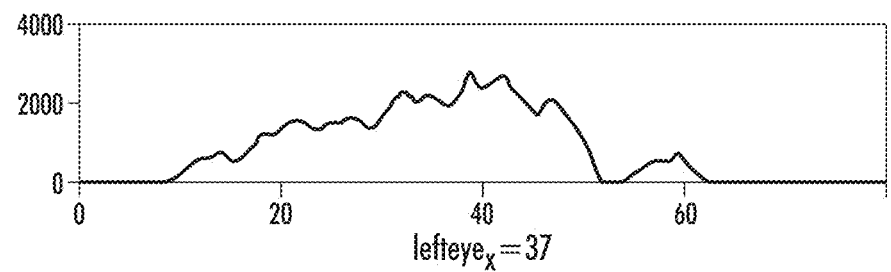
Figure 13:
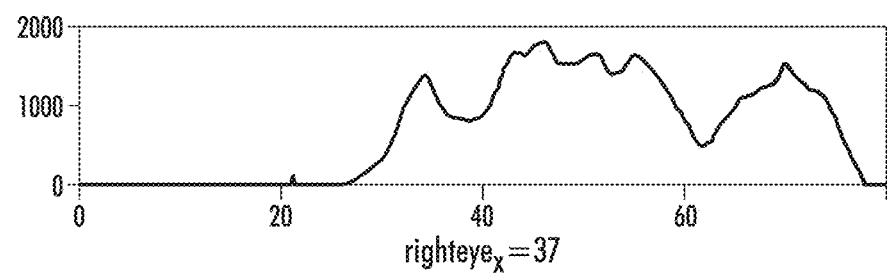
Figure 14:
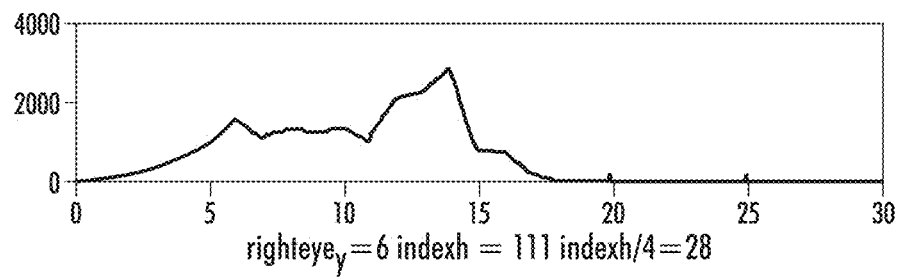
Figure 15:
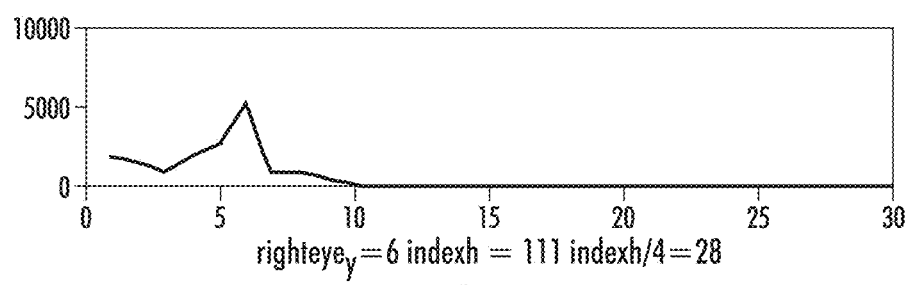
Figure 16:
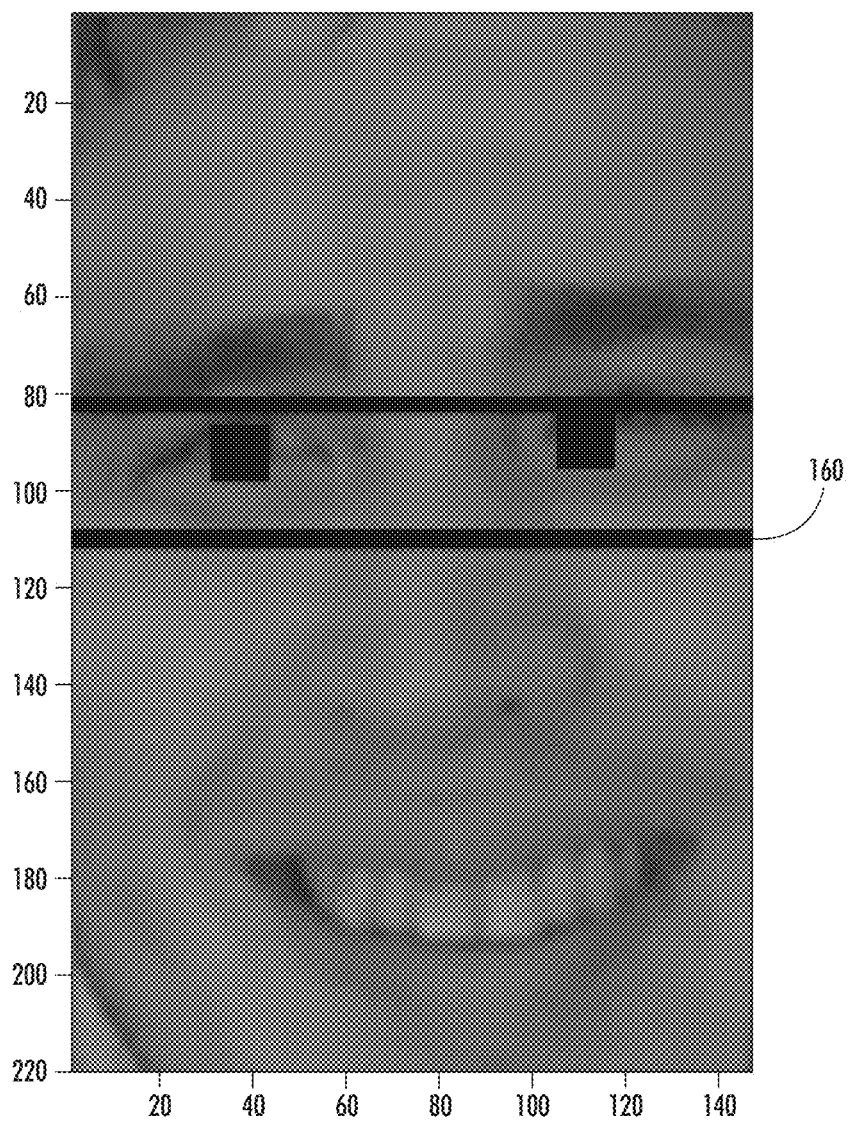
Figure 17:
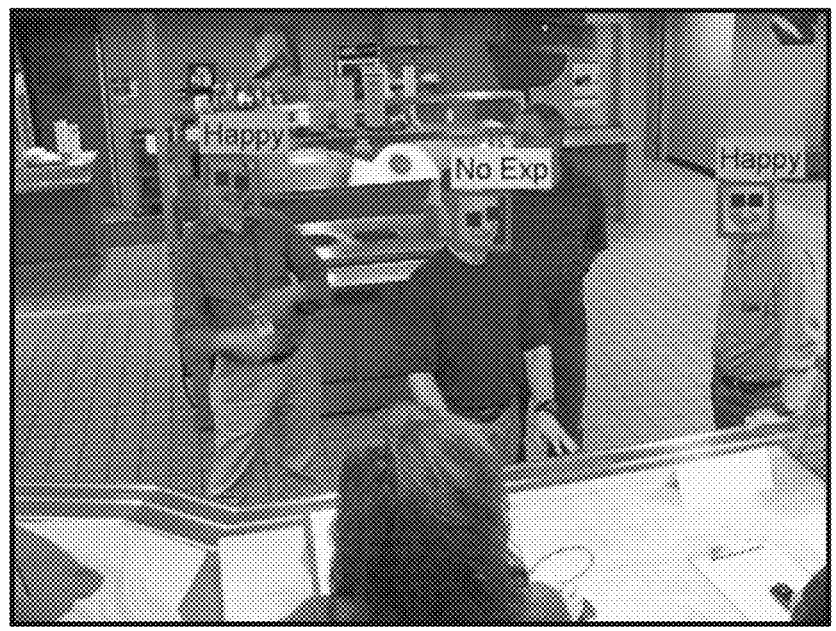
FIGS. 17 and 18 are examples of resulting video frames with classified human faces, based on the TET1 dataset.
Figure 18:
Figure 19:
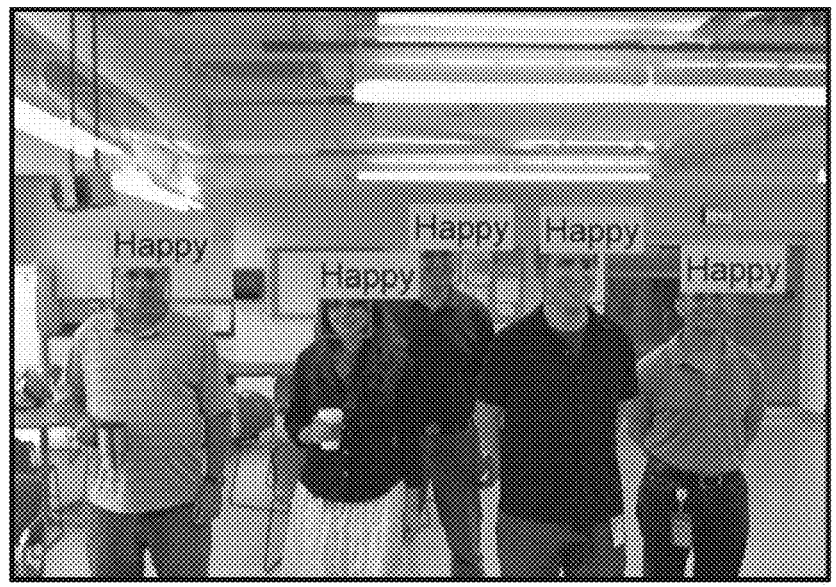
FIGS. 19-22 are examples of resulting video frames with classified human faces, based on the TET2 dataset.
Figure 20:
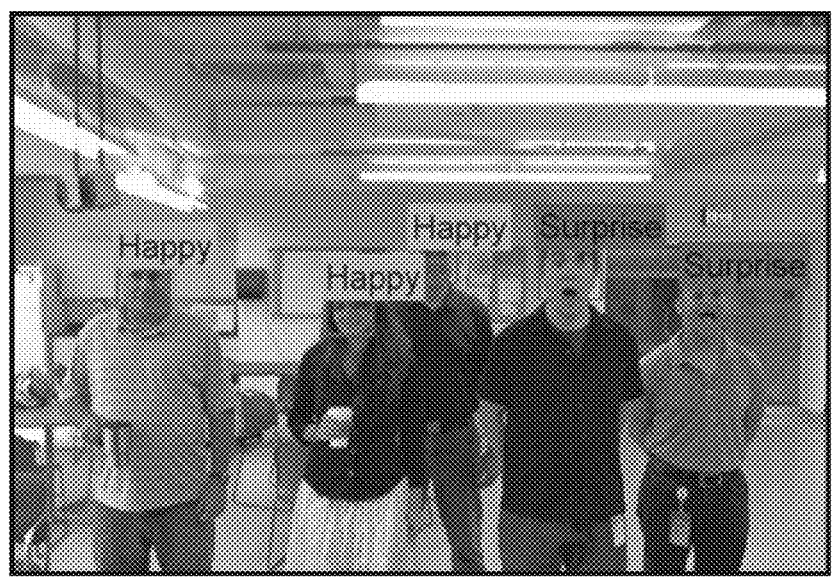
Figure 21:
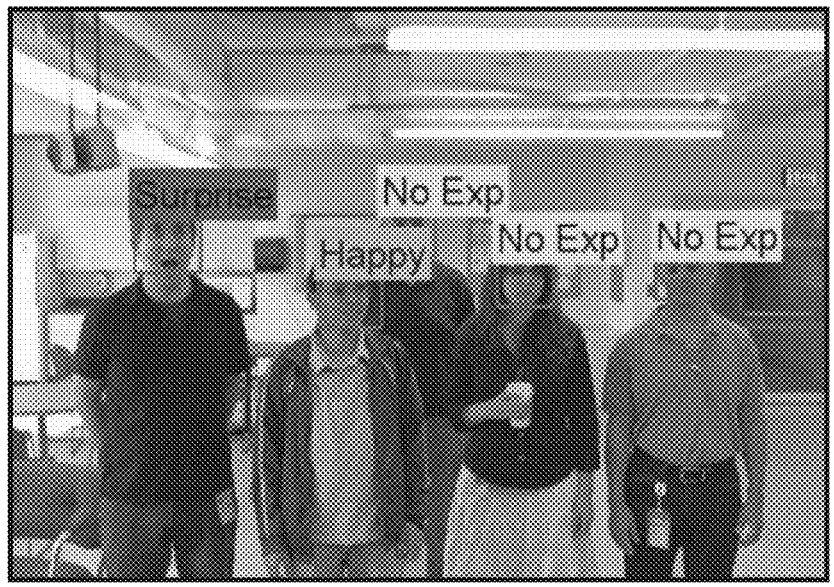
Figure 22:

Next, after all R-LBP values are found for every pixel in the face image, several steps are used to localize the periocular region which are illustrated in FIGS. 6-16:

a) Generate an R-LBP image, where each pixel value is the R-LBP byte calculated for that pixel. Regions that contain higher contrast edges are whiter, low contrast edges appear blacker. See FIG. 6.

b) Use an initial estimate at the vertical position of both eyes based on average face dimensions and calculate a vertical projection by summing up all rows along each column. See FIG. 7. The mean of this graph provides the initial left/right split of the face.

c-d) Use FIG. 6 and FIG. 7 to split eyes into a final search space for both left and right eye regions, resulting in FIG. 8 and FIG. 9, respectively.

e-f) Dilate these regions to create a more solid eye silhouette. See FIG. 10 and FIG. 11. This allows for more stable projections in the next step, since local minima is removed.

g-j) Using the mean of the vertical and horizontal projects of the dilated regions, i.e. FIG. 10 and FIG. 11 representing the left eye and right eye, respectively, calculate a centroid to locate the center of periocular region. See FIGS. 12-15.

After the periocular region is estimated 160, the final face image can then be extracted. See FIG. 16. This is again based on an average face geometry, for example, see http://en.wikipedia.org/wiki/Vitruvian_Man. Based on the distance between the centroids for each eye region $C_L=(x_l,y_l)$ and $C_R=(x_r,y_r)$ the horizontal mid-point $$\mu_h = \frac{(x_r + x_l)}{2}$$

and the horizontal boundaries are defined by the lines at $(x_l-1.4\mu_h)$ and $(x_r+1.4\mu_h)$, while the vertical boundaries are defined by the lines defined at $(y_l-1.7\mu_h)$ and $(y_r+3.2\mu_h)$. Note that the origin is defined at the top left image point (0,0).

Offline Step 4. Process Each Face Image to Increase Robustness to Lighting and Scale Variation:

In many surveillance videos, the illumination on the face is not ideal. It can suffer from defects such as over exposure, under exposure, low contrast, nonuniformity, and variation for different portions of the image frame due to variation in ambient light. It is beneficial to process the gray levels of the extracted face image so that it possesses high contrast, and also a consistent contrast condition between training and classification. Various methods may be used, such as applying contrast enhancing tone reproduction curves, or other gray-level histogram modification techniques. In an exemplary embodiment we employ histogram equalization. Noise reduction techniques, such as median filtering or low pass filtering may also be applied to reduce errors in LBP calculation due to sensor noise. The face is then ready for feature extraction and classification.

Offline Step 5. Assign Each Face an Expression Category:

Faces are then assigned a category based on a human's interpretation of the expression. This could be performed by one or more observers or assisted by an algorithmic reference method.

Offline Step 6. Calculate Representative Features:

Feature extraction is a process whereby high dimensional input data is mapped onto a typically lower-dimensional space that has desirable classification properties. In some instances, feature extraction may result in an increase in dimensionality (e.g. kernel expansion techniques). As such, it is expected that values of features corresponding to different instances of the same expression will be similar, while values of features corresponding to instances of different expressions will be different. One example of features that have been found to have good discriminate properties for expression classification are Local Binary Patterns (LBP).

The LBP features are calculated using the LBP operator discussed in step 3, with a few additional steps. First, as disclosed in "Face recognition with local binary patterns", some patterns occur more frequently and in fact contain the majority of textural information, i.e. over 85%. These patterns are called "uniform patterns" and consist of those byte values which have at most two binary transitions starting at the left or right most bit and moving to the opposite side. For example 11001111, 00011111, and 11111111 are uniform patterns since they contain two, one, and zero transitions respectively. However, 11001010, 00010010, and 01010111 are not since they each contain more than two transitions; five, four, and five transitions respectively. Overall, there are 58 uniform patterns out of a possible 256 total patterns. After encoding each pixel in the image with a byte value, a histogram is generated that spans all 255 different possible patterns. However, as shown in "Facial expression recognition based on Local Binary Patterns: A comprehensive study", calculating a histogram of all patterns over an entire face image eliminates any spatial information, since bins in the histogram are accumulated from each pixel. In order to address this, the face image is first divided into M×N windows, which allows for the calculation of several histograms, one for each window. These histograms are then concatenated together to form one large feature vector of size M×N×58 which contains both the textural and spatial information of the face. Choosing an optimal value of M and N is mainly dependent on the resolution of the face image, but also effects the classification accuracy and parameter tuning discussed in step 6 below.

Offline Step 7. Determine Correspondence

The representative features for the face image is then mapped to an expression label.

Offline Step 8. Repeat the Labeling Steps:

The labeling steps are repeated until the representative features for faces found in the training set have been mapped to corresponding expression labels.

Offline Step 9. Train Classifier

The training process stage uses several hundred examples of faces with manually labeled expressions to learn characteristics that maximize variability between different expressions and minimize variability within the same expression. According to one exemplary embodiment, a support vector machine (SVM), a well-known machine learning technique is used. Other classification techniques such as those based on data clustering, neural networks or logistic regression can be used. The SVM is a binary classifier which separates two classes with a hyper-plane in a dimension typically higher than that of the feature vector itself. It is represented by the following function:

$$f(x) = \text{sgn}\left(\sum_{i=1}^{l} \alpha_i \gamma_i K(x_i, x) + b\right)$$

where $\alpha_i$ are Lagrange multipliers that form the separating hyper-plane, $y_i$ is the label for the feature vector $x_i \in (-1,1)$, l is the number of training samples, $K(x_i,x)$ is the kernel function, and b is the penalty threshold for misclassification. See "Facial expression recognition based on Local Binary Patterns: A comprehensive study". Several kernels are available to use, including a linear, polynomial, radial basis function (RBF), and hyperbolic. For purposes of this discussion, the RBF kernel is used since it provided the most reliable results during testing. The RBF is a Gaussian based kernel that relies on several parameters shown in the following equation:

$$k(x_i,x) = \exp(-|x_i-x|^2/2\sigma^2).$$

See http://www.csie.ntu.edu.tw/~cjlin/libsvm/.

Choosing the correct value of a and b are critical steps for achieving good results. Typically a grid-based search is sufficient for this task, resulting in only several hundred attempts to find optimal results, i.e. vary $b \in (1,10)$ and σ∈(1,20). However, during experiments, it was found that optimal choices of b and σ are also dependent on the initial choice of M and N, i.e. number of window divisions as discussed in step 5, where M and N, each can vary from 1 to 10. This leads to greater than 20,000 possibilities which is an infeasible number of choices to search through using a grid search. Therefore, an exemplary embodiment uses SIMPLEX optimization and a 10-fold cross validation. See "A Simplex Method for Function Minimization". A 10-fold cross validation method divides a training dataset into 10 partitions, and then trains on 9 partitions and testing part on the partition left out. This process is repeated 10 times and the final scores are averaged over all 10 runs. According to one exemplary embodiment, the training set consisted of the Kohn-Kanade dataset which contains over 900 example ground-truth expressions. See "Comprehensive database for facial expression analysis." According to one exemplary embodiment, a spider SVM MATLAB implementation was used for the training and classification stage. See http://www.kyb.tuebingen.mpg.de/bs/people/spider/index.html.

Online Step 1. Acquire Video:

This step is similar to Offline Step 1, where in the present case the video is acquired in the surveillance setting of interest.

Online Step 2. Detect Faces

This step is similar to Offline Step 2, where in the present case faces in the surveillance video of interest are used.

Online Step 3. Localize Periocular Region

This step follows the process of Offline Step 3.

Online Step 4. Process Each Face Image to Increase Robustness to Lighting and Scale Variation:

This step follows the process of Offline Step 4.

Online Step 5. Calculate the Representative Features Used in the Offline Process for Face Images This step follows the process of Offline Step 6.

Online Step 6. Automatically Classify the Expression of the Face Using the Features and the Trained Classifier Generated in the Offline Training Stage.

The classification stage occurs for one or more detected faces found in an input video frame by querying the extracted feature vector(s) corresponding to each detected face into the trained SVM, which outputs the expression class. Note that when training for several expressions, a "one-to-rest" approach is used that trains a binary classifier between each class and all other classes. The class which has the highest binary count is returned as the final output. According to one exemplary embodiment, a spider SVM MATLAB implementation was used for the training and classification stage. See http://www.kyb.tuebingen.mpg.de/bs/people/spider/index.html.

As discussed above, there were a total of three datasets used in experiments on the disclosed method/system for detecting, extracting and classifying human faces: One training dataset (Kohn-Kanade), and two testing datasets taken in the surveillance setting of interest. Experiments were organized as shown in Table 1.

TABLE 1

Experimental setup

| Experiment | Training Set | Testing Set | Expressions | Resolution | Face Resolutions |
|---|---|---|---|---|---|
| Exp-1 | Kohn-Kanade (10-fold) | Kohn-Kanade (10-fold) | Neutral, Happy, Sad, Surprise, Fear, Anger, Disgust, Contempt | 640 × 480 | 190 × 220 |
| Exp-2 | Kohn-Kanade | TET1 | Neutral, Happy | 640 × 480 | 25 × 25-50 × 50 |
| Exp-3a | Kohn-Kanade | TET2 | Neutral, Happy, Sad, Surprise | 1920 × 1200 | 60 × 80-80 × 100 |
| Exp-3b | Kohn-Kanade | TET2 | Happy, Sad, Surprise | 1920 × 1200 | 60 × 80-80 × 100 |

The Kohn-Kanade dataset contained over 100 subjects, each performing a subset of all possible expressions that included neutral, smile, sad, disgust, fear, surprise, contempt, and anger. The peak temporal segments of the expressions of each of these categories were used for training data.

The testing datasets included two scenarios: the first scenario (TET1) was recording in a cafeteria-like setting where individuals were asked to wait in line and purchase a food product using a voucher given to them prior to entering the café. Participants were not aware they were being recorded for their expressions, hence genuine smile and neutral expressions occur throughout each video. There were 90 minutes of video for this dataset. The second dataset (TET2) consisted of individuals who were asked to feign several expressions (smile, surprise, sad, and neutral) while waiting in a queue in a cafeteria like setting. While these expressions are not genuine, they did offer a wider range of testing data.

Example results for the TET1 and TET2 datasets are given in FIGS. 17-22.

Described hereto is primarily processing of a single video frame. Importantly, there is often noise, movement, pose change, etc., between frames that yield different detected facial expressions for a short number of frames. To make the disclosed method and system of detecting, extracting and classifying a facial expression more robust, the sequential multi-frame aspect of the video can be utilized. For example, a valid facial expression can be qualified as an expression existing for a predetermined duration of time, e.g. at least one second, and/or for a predetermined percentage of time. Alternatively, a statistical mode can be implemented to use multiple video frames, whereby the most frequently occurring expression is determined to be the valid expression. For example, the statistical mode could analyze 60 sequential video frames over 2 seconds, where the video stream is 30 fps (frames per second). This video data could be analyzed in a time block with an expression delivered per time block, i.e., one expression per two second interval, or a sliding time window can be utilized, where an expression is detected at each instant using a time window about the instant, e.g. 2 seconds.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

Figure 4:
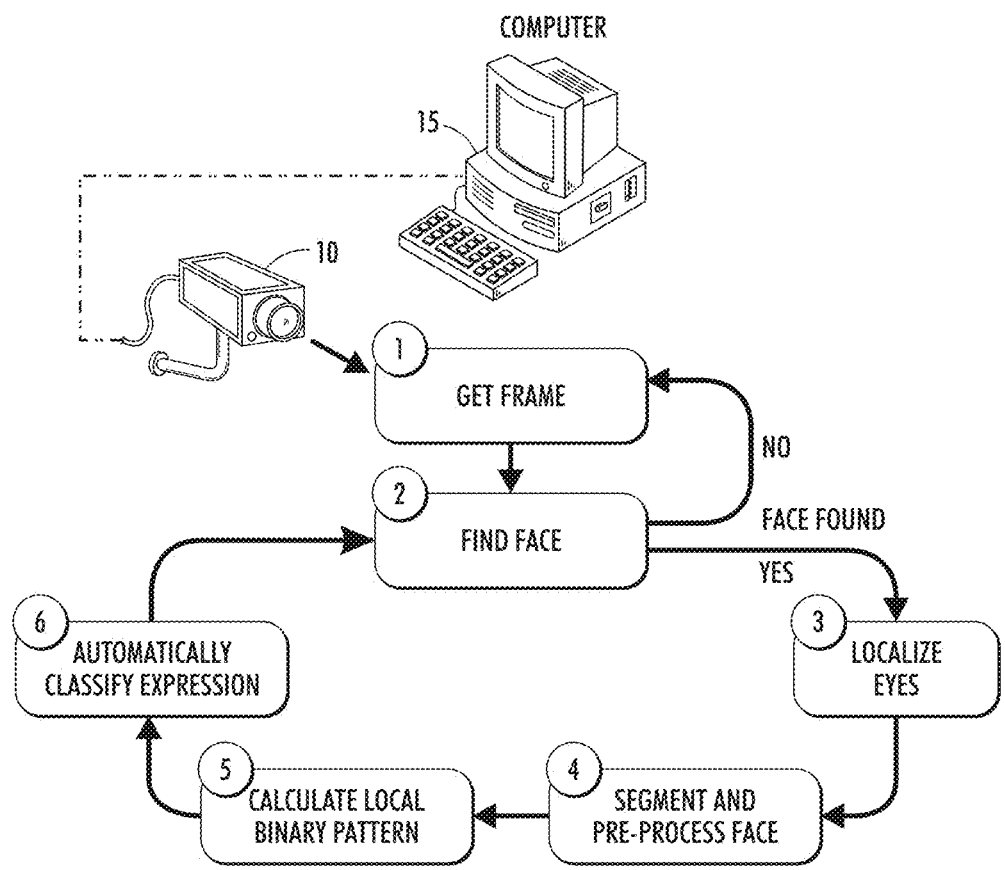
FIG. 4 is a block diagram of an online processing stage according to an exemplary embodiment of this disclosure.

The methods illustrated in FIGS. 3 and 4, and described throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image capturing system comprising:
an image capturing device; and
an image processor operatively associated with the image capturing device, the image processor configured to perform a method of detecting, extracting and classifying a facial expression associated with a human face, the method comprising:
a) acquiring a surveillance video sequence using at least one video camera operatively connected to a computer, the video sequence including one or more video frames including a human face;
b) detecting in the video sequence the one or more video frames including the human face and extracting a facial region associated with the detected human face;
c) automatically detecting and localizing within the extracted facial region a periocular region associated with the extracted facial region by initially estimating the location of the periocular region within the extracted facial region based on an average geometric relationship of an average periocular region relative to an average extracted facial region associated with an average human face, and subsequently processing a subregion of the extracted facial region substantially centered about the initial estimate of the location of the periocular region to calculate an actual location of the periocular region associated with the extracted facial region and segmenting the extracted facial region of the video frame including the human face about the actual location of the detected and localized periocular region based on an average geometric relationship of the average human face relative to a location of the average periocular region and the segmented facial region including a greater total number of pixels than the periocular region;
d) processing the segmented facial region associated with the video frame including the human face to a predetermined lighting and scale condition;
e) extracting representative features associated with the segmented facial region; and
f) classifying automatically the expression of the segmented facial region by querying the extracted representative features associated with the segmented facial region into an expression classifier, the expression classifier outputting one of the plurality of expression classes associated with the segmented facial region.

2. The image capturing system according to claim 1, wherein the image capturing system is operatively associated with a retail environment and the human face is associated with one or both of a customer and an employee.

3. The image capturing system according to claim 1, wherein the image capturing system is operatively associated with a security surveillance system.

4. The image capturing system according to claim 1, step f) comprising:
   accessing a support vector machine associated with a facial expression database, and classifying the appearance of the human face associated with the video frame based on inputting an extracted feature vector to the support vector machine.

5. The image capturing system according to claim 1, wherein a resolution of the acquired video sequence is substantially 640×480 or lower.

6. The image capturing system according to claim 1, further comprising:
   repeating steps a)-f) for a plurality of temporal spaced video frames including the human face; and
   detecting if the facial expression associated with the human face changed over the span of the temporal spaced video frames.

7. The image capturing system according to claim 1, wherein step b) uses a Haar-feature classifier trained to detect human faces.

8. The image capturing system according to claim 1, wherein step e) uses one of LBP (local binary pattern), HOG (histogram of gradients), SIFT (scale invariant feature transform), and SURF (speeded up robust features) calculations to extract a feature vector from the second pixel region.

\* \* \* \* \*